US012625248B2

(12) United States Patent
Hwang

(10) Patent No.: US 12,625,248 B2
(45) Date of Patent: *May 12, 2026

(54) RADAR APPARATUS AND OPERATING METHOD THEREOF

(71) Applicant: SAMSUNG ELECTRONICS CO., LTD., Suwon-si (KR)

(72) Inventor: Inoh Hwang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

This patent is subject to a terminal disclaimer.

(21) Appl. No.: 18/638,182

(22) Filed: Apr. 17, 2024

(65) Prior Publication Data

US 2024/0264298 A1 Aug. 8, 2024

Related U.S. Application Data

(63) Continuation of application No. 16/851,885, filed on Apr. 17, 2020, now Pat. No. 11,988,738.

(30) Foreign Application Priority Data

Nov. 26, 2019 (KR) ......................... 10-2019-0153552

(51) Int. Cl.
*G01S 13/58* (2006.01)
*G01S 7/481* (2006.01)
(Continued)

(52) U.S. Cl.
CPC .......... *G01S 13/583* (2013.01); *G01S 7/4815* (2013.01); *G01S 7/4817* (2013.01); *G01S 13/34* (2013.01);
(Continued)

(58) Field of Classification Search
CPC .... G01S 13/583; G01S 13/937; G01S 13/933; G01S 7/4815; G01S 13/931
See application file for complete search history.

(56) References Cited

U.S. PATENT DOCUMENTS

| 6,067,038 A | 5/2000 | Uehara et al. |
| 6,486,827 B2 | 11/2002 | Small |
| (Continued) | | |

FOREIGN PATENT DOCUMENTS

| CN | 108120983 A | 6/2018 |
| CN | 108415023 A | 8/2018 |
| (Continued) | | |

OTHER PUBLICATIONS

Communication dated Apr. 8, 2022 issued by the European Patent Office in EP Application No. 20171718.8.
(Continued)

*Primary Examiner* — Marcus E Windrich
(74) *Attorney, Agent, or Firm* — Sughrue Mion, PLLC

(57) ABSTRACT

A radar apparatus includes a transmitter configured to transmit electromagnetic waves; a receiver configured to receive electromagnetic waves that are reflected; and a processor configured to extract a relative velocity, with respect to the radar apparatus, of at least one front object based on the electromagnetic waves received by the receiver, wherein the processor is further configured to locally adjust respective resolutions of scanning front regions based on the relative velocity of the at least one front object.

17 Claims, 10 Drawing Sheets

(51) Int. Cl.

| | |
|---|---|
| *G01S 13/34* | (2006.01) |
| *G01S 13/931* | (2020.01) |
| *G01S 13/933* | (2020.01) |
| *G01S 13/937* | (2020.01) |
| *G01S 17/58* | (2006.01) |

(52) U.S. Cl.

CPC .......... *G01S 13/931* (2013.01); *G01S 13/933* (2020.01); *G01S 13/937* (2020.01); *G01S 17/58* (2013.01)

(56) References Cited

U.S. PATENT DOCUMENTS

| 9,383,753 | B1 | 7/2016 | Templeton et al. |
|---|---|---|---|
| 10,185,027 | B2 | 1/2019 | O'Keeffe |
| 10,197,669 | B2 | 2/2019 | Hall et al. |
| 11,294,061 | B1* | 4/2022 | Doerr .................... G01S 7/4817 |
| 2005/0140541 | A1 | 6/2005 | Yamagami et al. |
| 2013/0234880 | A1 | 9/2013 | Lee et al. |
| 2015/0226853 | A1 | 8/2015 | Seo et al. |
| 2016/0116570 | A1 | 4/2016 | Ramasubramanian et al. |
| 2017/0247036 | A1 | 8/2017 | Halder et al. |
| 2017/0328990 | A1* | 11/2017 | Magee ................. G01S 17/931 |
| 2018/0045819 | A1 | 2/2018 | Cornic et al. |
| 2018/0113200 | A1 | 4/2018 | Steinberg et al. |
| 2018/0149737 | A1 | 5/2018 | Kim et al. |
| 2018/0232892 | A1 | 8/2018 | Chang |
| 2018/0372837 | A1* | 12/2018 | Bily ........................ G01S 7/032 |
| 2019/0096255 | A1 | 3/2019 | Mills et al. |
| 2019/0137601 | A1* | 5/2019 | Driscoll .................... G01S 7/03 |
| 2019/0180502 | A1* | 6/2019 | Englard .................... G01S 7/40 |
| 2019/0219681 | A1 | 7/2019 | Atsushi et al. |
| 2019/0324134 | A1 | 10/2019 | Cattle |
| 2020/0041612 | A1* | 2/2020 | Harrison ................... G01S 7/40 |
| 2020/0072957 | A1* | 3/2020 | Choi ........................ G01S 13/34 |
| 2020/0158861 | A1* | 5/2020 | Cattle ................ G01S 13/9029 |
| 2020/0249314 | A1 | 8/2020 | Eshet et al. |
| 2020/0400810 | A1 | 12/2020 | Cho et al. |
| 2021/0011146 | A1* | 1/2021 | Bialer ................... G01S 13/343 |
| 2021/0156982 | A1* | 5/2021 | Stettiner ................. G01S 7/356 |
| 2021/0318413 | A1* | 10/2021 | Arkind .................... G01S 13/34 |
| 2022/0068138 | A1 | 3/2022 | Kang |
| 2022/0373645 | A1 | 11/2022 | Travnikar et al. |

FOREIGN PATENT DOCUMENTS

| DE | 10 2015 106 140 A1 | 10/2016 |
|---|---|---|
| JP | 6-94836 A | 4/1994 |
| JP | 11-72561 A | 3/1999 |
| JP | 2004-535562 A | 11/2004 |
| JP | 2018-205120 A | 12/2018 |
| JP | 2019-512705 A | 5/2019 |

OTHER PUBLICATIONS

Communication dated Oct. 26, 2020, issued by the European Patent Office in counterpart European Application No. 20171718.8.

Communication issued Jan. 28, 2021 by the European Patent Office in counterpart European Patent Application No. 20171718.8.

Office Action issued on Dec. 19, 2024 by the Chinese Patent Office in corresponding CN Patent Application No. 202010422164.9.

Communication issued Oct. 27, 2025 by the China National Intellectual Property Administration in Chinese Patent Application No. 202010422164.9.

* cited by examiner

126

125

RADAR APPARATUS AND OPERATING METHOD THEREOF

CROSS-REFERENCE TO RELATED APPLICATION

This application is a continuation application of U.S. application Ser. No. 16/851,885, filed Apr. 17, 2020, which claims priority to Korean Patent Application No. 10-2019-0153552, filed on Nov. 26, 2019, in the Korean Intellectual Property Office, the disclosure of which is herein incorporated by reference in its entirety.

BACKGROUND

1. Field

Example embodiments of the disclosure relate to radar apparatuses and operating methods thereof, and more particularly, to radar apparatuses capable of adjusting a local resolution by using a velocity or distance information of front objects and operating methods thereof.

2. Description of Related Art

Advanced driving assistance systems (ADAS) having various functions have recently been commercialized. For example, vehicles having various functions such as adaptive cruise control (ACC) or autonomous emergency braking system (AEB) are used. ACC is a function of recognizing positions and velocities of other vehicles ahead of a vehicle, slowing the vehicle when there is a risk of collision, and maintaining the velocity of the vehicle in a preset velocity range when there is no risk of collision. AEB is a function of recognizing other vehicles ahead of a vehicle and preventing a collision by automatically braking when there is a risk of collision and a driver does not take an action or the driver's action is not appropriate. Also, autonomous vehicles are expected to be commercialized in the near future.

Accordingly, the importance of vehicle radar apparatuses for providing information of vehicles in front has increased. For example, light detection and ranging (LIDAR) sensors are commonly used as vehicle radars, and the LiDAR sensors measure a distance to a measurement target along with a velocity, an azimuth position, etc. of the measurement target based on a time taken when a laser is irradiated and a scattered or reflected laser returns to the sensor, an intensity change of the laser, a frequency change of the laser, and/or a polarization state change of the laser.

SUMMARY

One or more example embodiments provide radar apparatuses capable of adjusting a local resolution by using a velocity or distance information of front objects and methods of operating the same.

Additional aspects will be set forth in part in the description which follows and, in part, will be apparent from the description, or may be learned by practice of the presented embodiments of the disclosure.

According to an aspect of an example embodiment, there is provided a radar apparatus including: a transmitter configured to transmit electromagnetic waves; a receiver configured to receive the electromagnetic waves that are reflected; and a processor configured to extract a relative velocity, with respect to the radar apparatus, of at least one front object based on the electromagnetic waves received by the receiver, wherein the processor is further configured to locally adjust respective resolutions of scanning front regions based on the relative velocity of the at least one front object.

The at least one front object may include a first object and a second object, and the processor may be further configured to: control the transmitter to scan, at a first resolution, a first front region in which the first object moves at a relative velocity within a first relative velocity range, and control the transmitter to scan, at a second resolution higher than the first resolution, a second front region in which the second object moves at a relative velocity within a second relative velocity range higher than the first relative velocity range.

The processor may be further configured to control the transmitter to scan an entire front region at the first resolution in an initial stage.

The processor may be further configured to control the transmitter to scan an entire front region at a resolution less than the first resolution in an initial stage.

The at least one front object may further include a third object, and the processor may be further configured to control the transmitter to scan, at a third resolution higher than the second resolution, a third front region in which the third object moves at a relative velocity within a third relative velocity range higher than the second relative velocity range in a direction approaching the radar apparatus.

The at least one front object may include a first object, a second object, and a third object, and the processor may be further configured to: extract distances to the first, the second, and the third objects; control the transmitter to scan, at a first resolution, a first front region in which the first object moves at a relative velocity within a first relative velocity range; control the transmitter to scan, at a second resolution higher than the first resolution, a second front region in which the second object moves at a relative velocity within a second relative velocity range higher than the first relative velocity range and within a first distance range in a direction approaching to the radar apparatus, and control the transmitter to scan, at a third resolution higher than the second resolution, a third front region in which the third object moves at a relative velocity within the second relative velocity range and within a second distance range farther than the first distance range in the direction approaching the radar apparatus.

The processor may be further configured to update information about the relative velocity of the at least one front object after completing scanning in one frame with respect to an entire front region and again locally adjust the respective resolutions of scanning the front regions based on the updated information.

The transmitter may include: a transmitting element array including a plurality of transmitting elements which are one-dimensionally or two-dimensionally arranged, and a transmitting circuit configured to provide transmission signals to the plurality of transmitting elements, and the processor may be further configured to control the transmitting circuit such that, based on the transmission signals, phases of the electromagnetic waves emitted from the plurality of transmitting elements change according to a front region to which the electromagnetic waves are to be transmitted.

The processor may be further configured to extract the relative velocity of the at least one front object by using a frequency modulated continuous wave (FMCW) method or a frequency shift keying (FSK) method.

The processor may be further configured to extract a distance to the at least one front object, and determine a possibility of collision with a front object among the at least one front object, based on information about the extracted distance to the front object and the relative velocity of the front object.

The radar apparatus may further include: a warning signal transmitter configured to, based on the possibility of collision being higher than a reference value, transmit a first warning signal to the front object with respect to the possibility of collision, the first warning signal including information about a relative position of the radar apparatus with respect to the front object; and a warning signal receiver configured to receive a second warning signal from another object with respect to the possibility of collision.

The processor may be further configured to, based on the warning signal receiver not receiving the second warning signal, control the transmitter to sequentially transmit the electromagnetic waves in respective predetermined directions.

The processor may be further configured to, based on the warning signal receiver receiving the second warning signal, control the transmitter to stop sequential transmission of the electromagnetic waves and to transmit the electromagnetic waves toward a position included in the second warning signal.

The radar apparatus may be mounted on a vehicle, a ship, an aircraft, or a drone.

According to an aspect of an example embodiment, there is provided a light detection and ranging (LiDAR) apparatus including: a transmitter configured to transmit a laser light; a photodetector configured to receive laser light that is reflected; and a processor configured to extract a relative velocity, with respect to the LiDAR apparatus, of at least one front object based on the laser light received by the photodetector, wherein the processor is further configured to locally adjust respective resolutions of scanning front regions based on the relative velocity of the at least one front object.

The transmitter may include: a transmitting element array including a plurality of transmitting elements which are one-dimensionally or two-dimensionally arranged and operate by using an optical phased array (OPA) method; and a transmitting circuit configured to provide transmission signals to the plurality of transmitting elements, and the processor may be further configured to control the transmitting circuit such that, based on the transmission signals, phases of the laser light emitted from the plurality of transmitting elements change according to a front region to which the laser light is to be transmitted.

The processor may be further configured to extract the relative velocity of the at least one front object by using a frequency modulated continuous wave (FMCW) method or a frequency shift keying (FSK) method.

According to an aspect of an example embodiment, there is provided a method of operating a radar apparatus, the method including: transmitting, by a transmitter, electromagnetic waves; receiving, by a receiver, the electromagnetic waves that are reflected; extracting a relative velocity, with respect to the radar apparatus, of at least one front object based on the electromagnetic waves received by the receiver; and driving the transmitter to locally adjust respective resolutions of scanning front regions based on the relative velocity of the at least one front object.

The at least one front object may include a first object and a second object, and the driving may include: driving the transmitter to can, at a first resolution, a first front region in which the first object moves at a relative velocity within a first relative velocity range; and driving the transmitter to scan, at a second resolution higher than the first resolution, a second front region in which the second object moves at a relative velocity within a second relative velocity range higher than the first relative velocity range.

The method may further include driving the transmitter to scan an entire front region at the first resolution at an initial stage.

The method may further include driving the transmitter to scan an entire front region at a resolution lower than the first resolution at an initial stage.

The at least one front object may further include a third object, the method further including: driving the transmitter to scan, at a third resolution higher than the second resolution, a third front region in which the third object moves at a relative velocity within a third relative velocity range higher than the second relative velocity range and in a direction approaching the radar apparatus.

The at least one front object may include a first object, a second object, and a third object, the method further including: extracting distances to the first, the second, and the third objects; driving the transmitter to scan, at a first resolution, a first front region in which the first object moves at a relative velocity within a first relative velocity range; driving the transmitter to scan, at a second resolution higher than the first resolution, a second front region in which the second object moves at a relative velocity within a second relative velocity range higher than the first relative velocity range and within a first distance range in a direction approaching the radar apparatus; and driving the transmitter to scan, at a third resolution higher than the second resolution, a third front region in which the third object moves at a relative velocity within the second relative velocity range and within a second distance range farther than the first distance range in the direction approaching the radar apparatus.

The method may further include: updating information about the relative velocity of the at least one front object after completing scanning in one frame with respect to an entire front region; and driving the transmitter to again locally adjust the respective resolutions of scanning the front regions based on the updated information.

The transmitter may be configured to operate by using an optical phased array (OPA) method.

The relative velocity of the at least one front object may be extracted by using a frequency modulated continuous wave (FMCW) method or a frequency shift keying (FSK) method.

The method may further include extracting a distance to the at least one front object, and calculating a possibility of collision with a front object among the at least one front object, based on information about the extracted distance to the front object and the relative velocity of the front object.

The method may further include transmitting a first warning signal to the front object, the first warning signal including information about a relative position of the radar apparatus, with respect to the front object, based on the calculated possibility of collision being higher than a reference value.

The method may further include: driving, based on a second warning signal not being received, the transmitter to sequentially transmit the electromagnetic waves in respective predetermined directions; and driving, based on the second warning signal being received, the transmitter to stop sequential transmission of the electromagnetic waves and to transmit the electromagnetic waves toward a position included in the second warning signal.

According to an aspect of an example embodiment, there is provided a non-transitory computer-readable recording medium having recorded thereon a program which, when executed by at least one processor, causes the at least one processor to execute the method described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
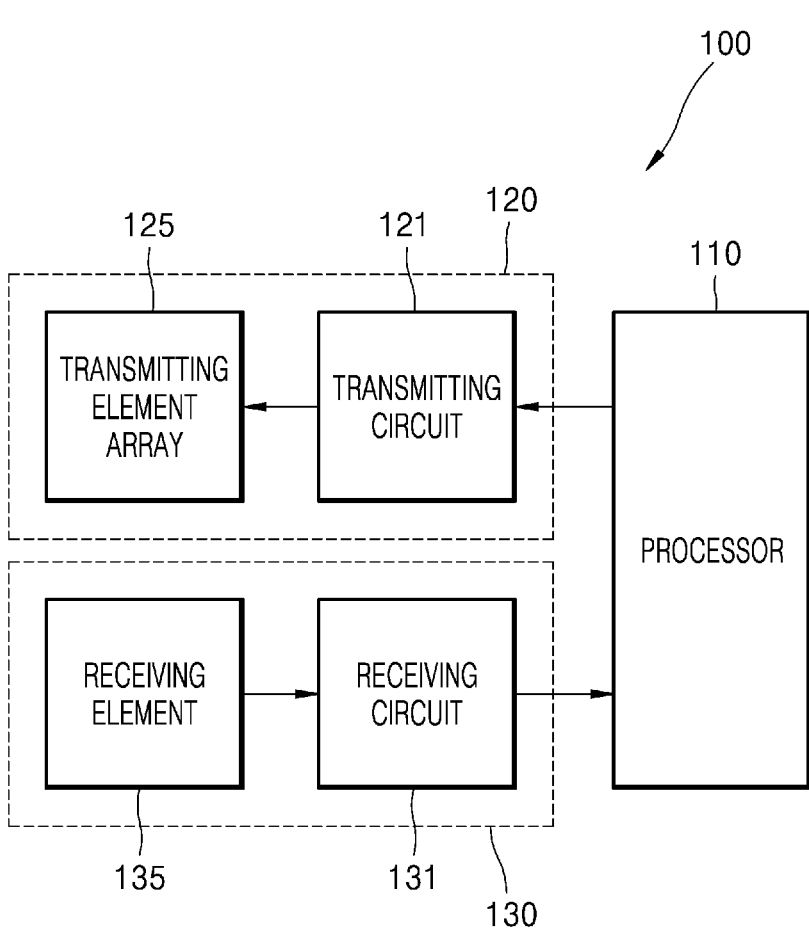
FIG. 1 is a block diagram illustrating a configuration of a radar apparatus according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the disclosure.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the present specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, with reference to the accompanying drawings, a radar apparatus and a method of operating the radar apparatus will be described in detail. Like reference numerals refer to like elements throughout, and in the drawings, sizes of elements may be exaggerated for clarity and convenience of explanation. The embodiments described below are merely examples, and various modifications may be possible from the example embodiments. In a layer structure described below, an expression "above" or "on" may include not only "immediately on in a contact manner" but also "on in a non-contact manner".

FIG. 1 is a block diagram illustrating a configuration of a radar apparatus 100 according to an example embodiment.

Referring to FIG. 1, the radar apparatus 100 according to an example embodiment may include a transmitter 120 that transmits electromagnetic waves to a forward environment, a receiver 130 that receives electromagnetic waves reflected from the forward environment, and a processor 110 that extracts information about the forward environment based on the received electromagnetic waves. The processor 110 may be configured to extract information about a distance to a front object (or an object that is positioned in front of the radar apparatus 100), an azimuth position of the front object, a relative velocity of the front object, etc. The processor 110 may also be configured to control the transmitter 120 and the receiver 130 based on the extracted information.

The transmitter 120 may include a transmitting element array 125 that includes a plurality of transmitting elements arranged one-dimensionally or two-dimensionally and a transmitting circuit 121 that provides a transmitting signal to each of the plurality of transmitting elements under the control of the processor 110. The receiver 130 may include a receiving element 135 that receives a signal reflected from the front object and a receiving circuit 131 that provides the signal received by the receiving element 135 to the processor 110. The receiving element 135 may include an array of multiple detectors which are one-dimensionally or two-dimensionally arranged, or may include only one detector.

Although illustrated as separate blocks in FIG. 1, the processor 110, the transmitting circuit 121, and the receiving circuit 131 may be provided as one semiconductor chip. Alternatively, the processor 110, the transmitting circuit 121, and the receiving circuit 131 may be provided on one printed circuit board (PCB). Alternatively, the transmitting circuit 121 and the receiving circuit 131 may be implemented as one semiconductor chip, and the processor 110 may be implemented as software that may be executed by a computer and stored in a recording medium. Alternatively, the processor 110 may be implemented as a programmable logic controller (PLC), a field-programmable gate array (FPGA), etc.

The radar apparatus 100 according to an example embodiment may be, for example, a light detection and ranging (LiDAR) sensor that transmits and receives laser light and extracts information about the forward environment, and a wavelength of the laser light may be a wavelength between ultraviolet and mid-infrared rays. However, the disclosure is not limited thereto, and various radar apparatuses capable of transmitting and receiving directional electromagnetic waves may be adopted as the radar apparatus 100 according to an example embodiment.

According to an example embodiment, the transmitter 120 may transmit electromagnetic waves to the forward environment by using a one-dimensional (1D) or two-dimensional (2D) scanning method. To this end, the transmitter 120 may sequentially or non-sequentially steer the electromagnetic wave beam (e.g., the laser beam) focused in a narrow region to front 1D or 2D regions at regular time intervals. For example, the transmitter 120 may be configured to emit the electromagnetic wave beam from a left to right direction or from a right to left direction with respect to the front 1D regions, or the transmitter 120 may be configured to emit the electromagnetic wave beam from a left to right direction or from a right to left direction and emit the electromagnetic wave beam from a bottom to top direction or from a top to bottom direction with respect to the forward 2D regions.

Figure 2A:
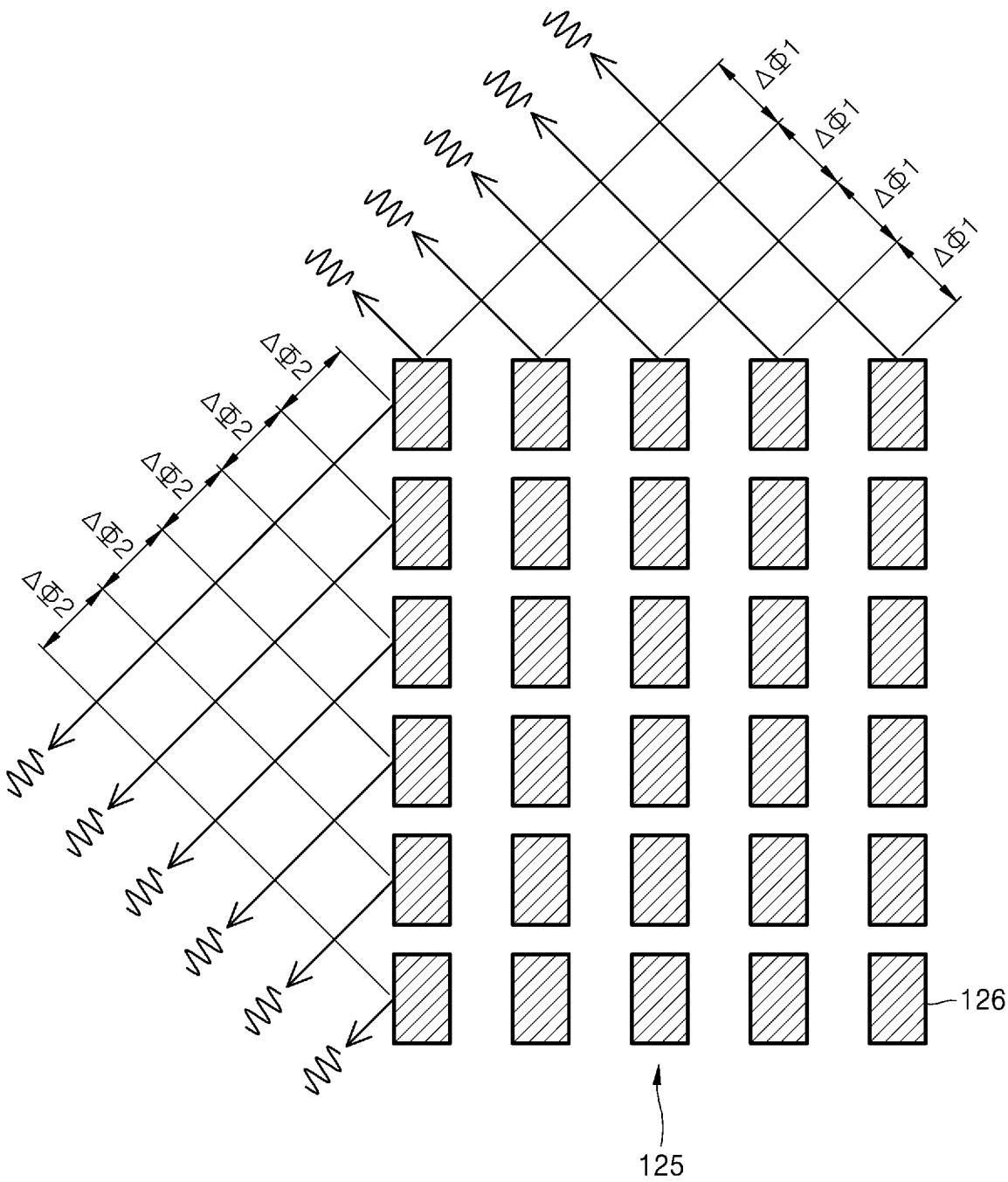
FIGS. 2A, 2B, and 2C are diagrams of a configuration and an operation of a transmitting element array for scanning electromagnetic beams according to example embodiments.
Figure 2B:
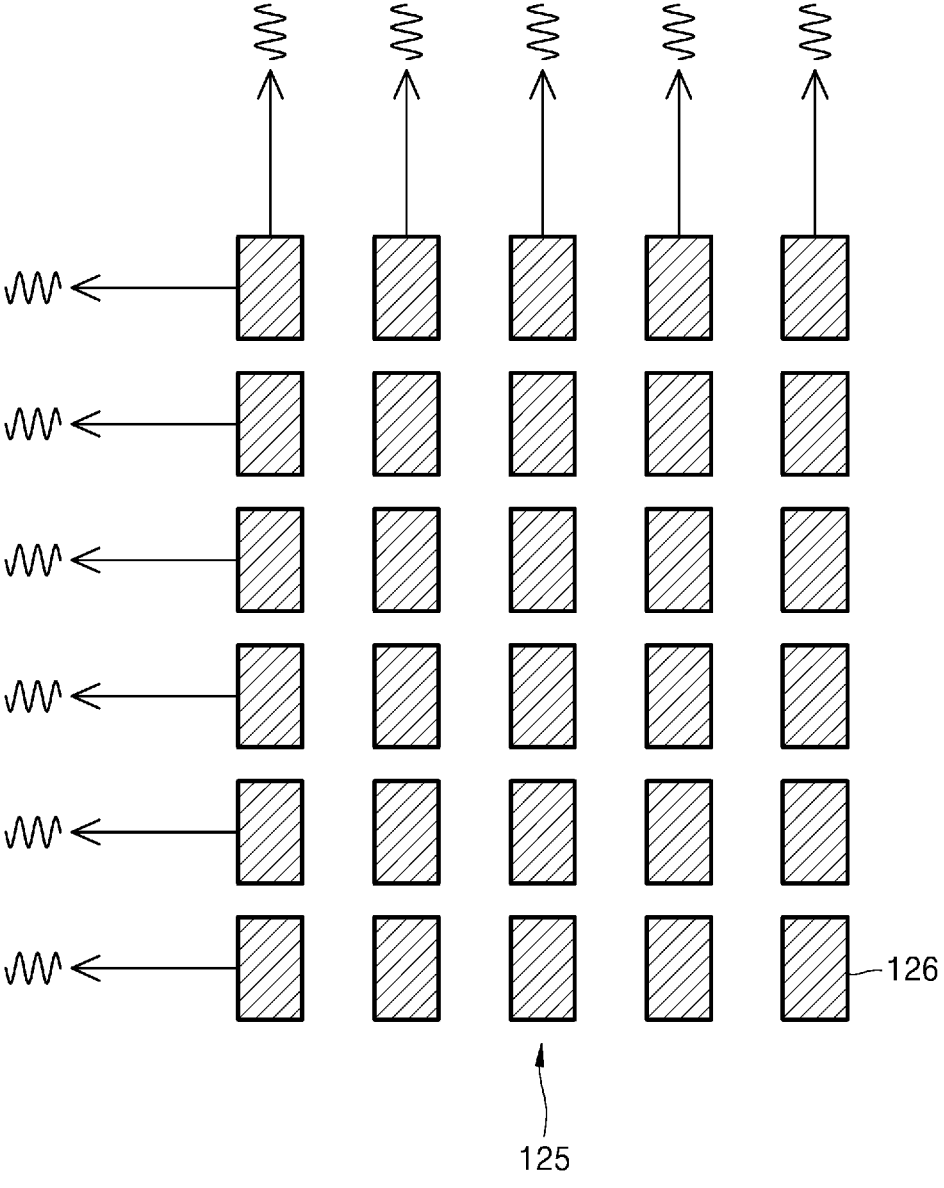
Figure 2C:
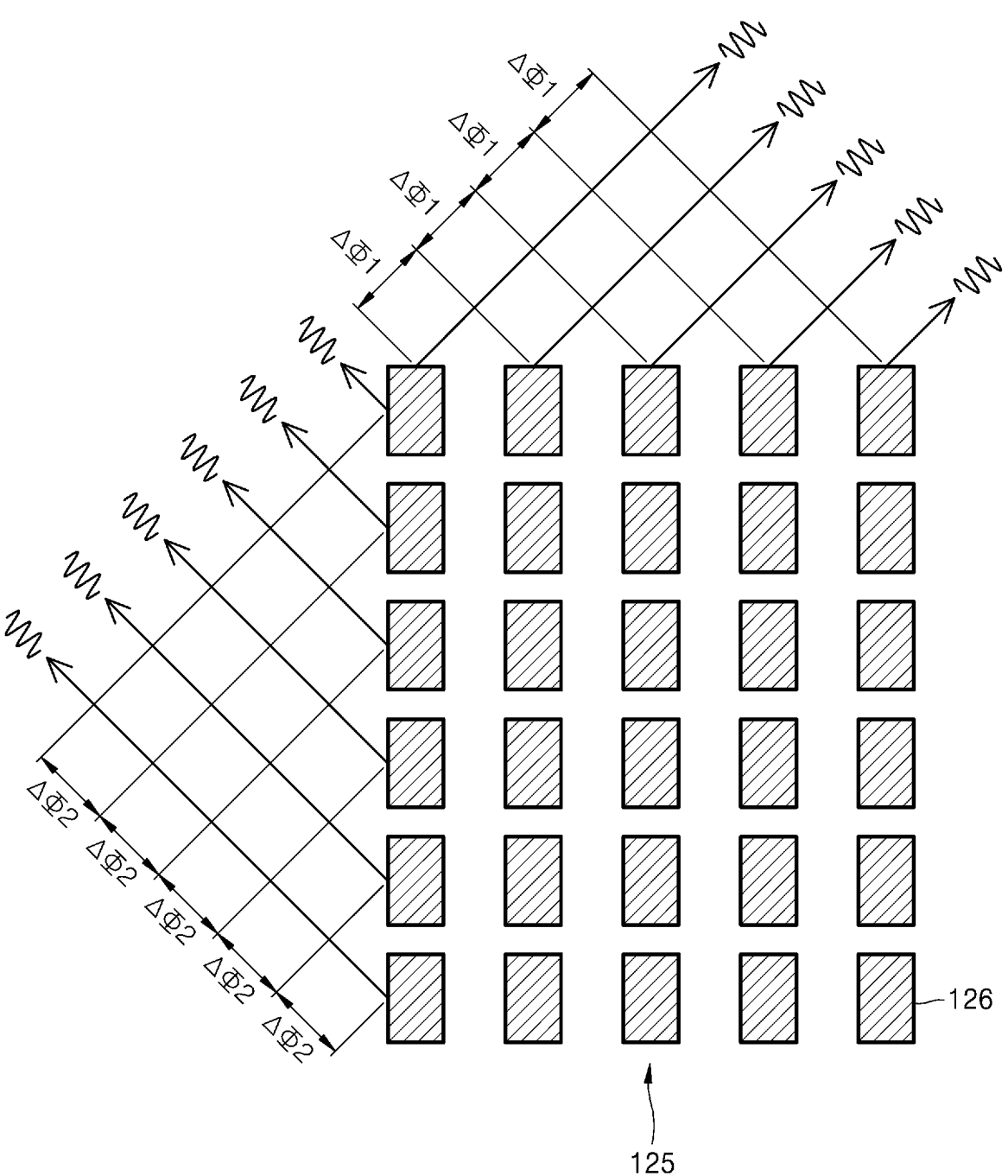

In order to transmit electromagnetic waves in this manner, the transmitter 120 may be variously configured. For example, the transmitting element array 125 of the transmitter 120 may be implemented by using an optical phased array (OPA) method. FIGS. 2A, 2B, and 2C are example diagrams of a configuration and an operation of the transmitting element array 125 for scanning electromagnetic beams. Referring to FIG. 2A, the transmitting element array 125 may include a plurality of transmitting elements 126 which are two-dimensionally arranged along a plurality of rows and a plurality of columns. Each transmitting element 126 may include, for example, a reflective antenna resonator that delays and reflects a phase of incident electromagnetic waves. The phase of the reflected electromagnetic waves may be determined by the voltage applied to each transmitting element 126. Alternatively, each transmitting element 126 may be configured to emit phase controlled electromagnetic waves.

In this structure, directions of electromagnetic beams emitted from the transmitting element array 125 may be controlled according to a phase difference between electromagnetic waves emitted from the plurality of transmitting elements 126. Specifically, propagation directions of electromagnetic beams may be controlled in a horizontal direction according to a phase difference $\Delta\phi1$ between electromagnetic waves emitted and/or reflected from the plurality of transmitting elements 126 arranged along the same row, and propagation directions of electromagnetic beams may be controlled in a vertical direction according to a phase difference $\Delta\phi2$ between electromagnetic waves emitted and/or reflected from the plurality of transmitting elements 126 arranged along the same column.

For example, as shown in FIG. 2A, when the phase of an electromagnetic wave is gradually delayed from the transmitting element 126 located at a rightmost position to the transmitting element 126 located at a leftmost position in the same row, an electromagnetic beam propagates in a leftward direction. An angle of an electromagnetic beam that propagates in the azimuth direction may be determined by the phase difference $\Delta\phi1$ between electromagnetic waves emitted and/or reflected from two adjacent transmitting elements 126 in the same row. When the phase difference $\Delta\phi1$ increases, the electromagnetic beam propagates further leftward, and when the phase difference $\Delta\phi1$ decreases, the electromagnetic beam propagates closer to a front of the row.

Also, when the phase of an electromagnetic wave is gradually delayed from the transmitting element 126 located at an uppermost position to the transmitting element 126 located at a lowermost position in the same column, the electromagnetic beam propagates in a downward direction.

An angle of an electromagnetic beam that propagates in the downward direction may be determined by the phase difference $\Delta\phi2$ between electromagnetic waves emitted and/or reflected from the two adjacent transmitting elements 126 in the same column. When the phase difference $\Delta\phi2$ increases, the electromagnetic beam propagates further downward, and when the phase difference $\Delta\phi2$ decreases, the electromagnetic beam propagates closer to a front of the column.

Referring to FIG. 2B, when $\Delta\phi1=0$ and $\Delta\phi2=0$, an electromagnetic beam emitted from the transmitting element array 125 propagates straightly toward the front of the corresponding row and the front of the corresponding column. Also, referring to FIG. 2C, when the phase of the electromagnetic wave is gradually delayed from the transmitting element 126 located at a leftmost position to the transmitting element 126 located at a rightmost position in the same row, the electromagnetic beam propagates in a rightward direction. When the phase of an electromagnetic wave is gradually delayed from the transmitting element 126 located at a lowermost position to the transmitting element 126 located at an uppermost position in the same column, the electromagnetic beam propagates in an upper direction.

Accordingly, an electromagnetic beam may be steered in a desired direction by individually controlling the phase of electromagnetic waves emitted and/or reflected from the plurality of transmitting elements 126 of the transmitting element array 125. To this end, the transmitting circuit 121 may be configured to independently apply voltages to the plurality of transmitting elements 126 respectively under the control of the processor 110. The phase of an electromagnetic wave emitted and/or reflected by each transmitting element 126 may be determined by the voltage applied to each transmitting element 126, and the direction of an electromagnetic beam emitted from the transmitting element array 125 may be determined by a combination of voltages applied to the plurality of transmitting elements 126.

However, an OPA is only an example for ease of understanding, and the configuration of the transmitter 120 is not necessarily limited to the OPA. For example, the transmitter 120 may include an actuator that rotates an electromagnetic source (e.g., a laser light source) that emits an electromagnetic beam. In this case, the actuator may adjust the direction of the electromagnetic beam by rotating the electromagnetic source. In another example, the transmitter 120 may include a mirror that reflects an electromagnetic beam and an actuator that rotates the mirror, or may include a micro electro mechanical system (MEMS) element that adjusts the reflection direction of the electromagnetic beam.

Also, in FIGS. 2A, 2B, and 2C, the transmitting element array 125 is illustrated as including the plurality of transmitting elements 126 which are two-dimensionally arranged along a plurality of rows and a plurality of columns, but is not necessarily limited thereto. For example, the transmitting element array 125 may include the plurality of transmitting elements 126 which are one-dimensionally arranged along one row and a plurality of columns or along a plurality of rows and one column. In this case, the transmitter 120 may transmit electromagnetic waves to the forward environment by using a 1D scanning method.

When the radar apparatus 100 according to an example embodiment is a LiDAR sensor, the receiving element 135 of the receiver 130 may be a photodetector that detects an electromagnetic beam such as laser light. The receiving circuit 131 may be connected to the photodetector of the receiving element 135 to receive a signal from the photodetector. The receiving circuit 131 may be configured to provide the processor 110 with information about the intensity of the laser light received by the photodetector, wavelength (frequency), phase, etc.

The processor 110 may be configured to extract information about a distance to a front object, an azimuth position of the front object, a relative velocity of the front object, etc. by using the information provided from the receiving circuit 131. The distance and velocity information may be obtained together by using, for example, a frequency modulated continuous wave (FMCW) method or a frequency shift keying (FSK) method.

Figure 3A:
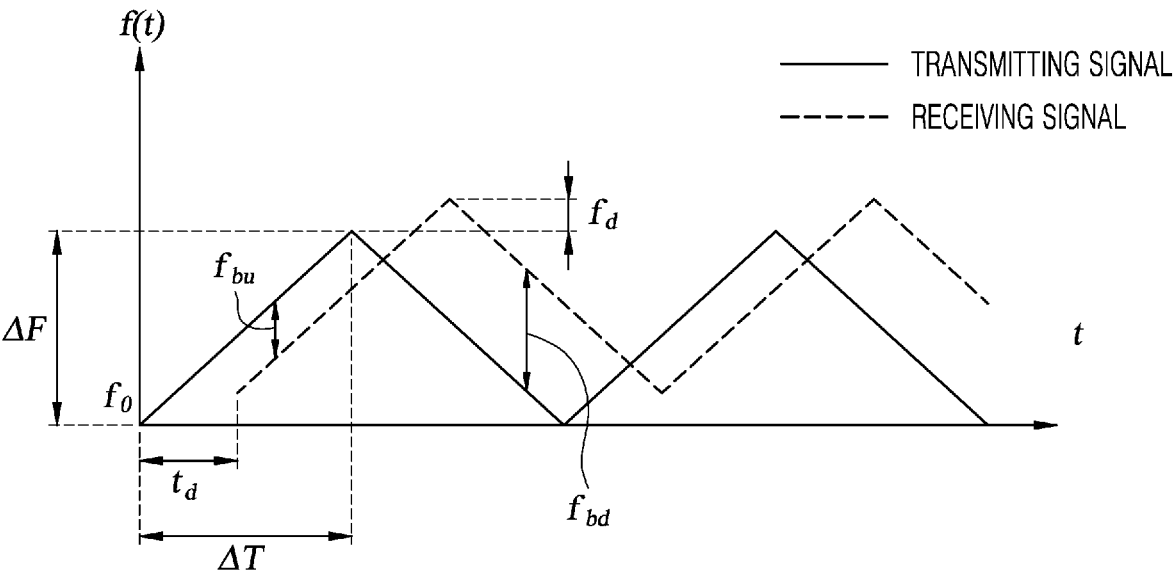
FIGS. 3A and 3B are graphs illustrating transmitting signals and receiving signals in a frequency modulated continuous wave (FMCW) method according to example embodiments.
Figure 3B:
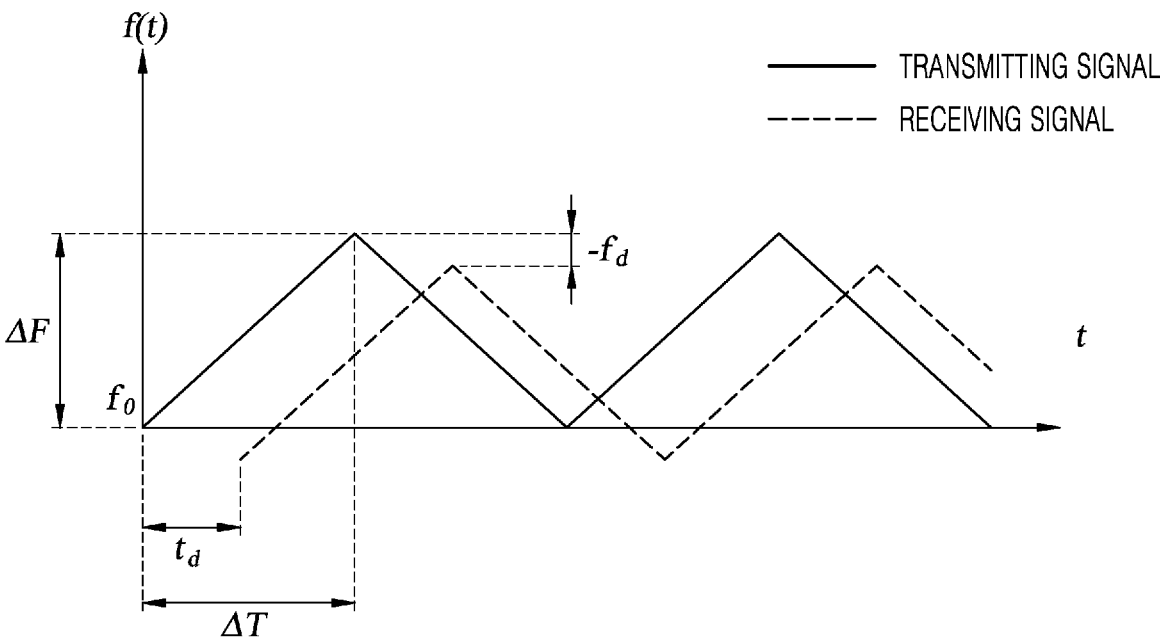

FIGS. 3A and 3B are example graphs illustrating transmitting signals and receiving signals in a FMCW method.

Referring to FIGS. 3A and 3B, the processor 110 may control the transmitter 120 to linearly increase and decrease the frequency of an emitted electromagnetic beam (that is, the transmitting signal) over time. When the relative velocity of a front object is not zero, a frequency shift occurs in the signal received through the receiver 130 due to the Doppler effect. For example, when the front object is approaching toward the radar apparatus 100, as shown in FIG. 3A, the frequency of the receiving signal is higher than the frequency of the transmitting signal. On the contrary, when the front object is receding from the radar apparatus 100, as shown in FIG. 3B, the frequency of the receiving signal is lower than the frequency of the transmitting signal.

In this case, a distance R to the front object and a relative velocity Vr of the front object may be obtained by Equations 1 and 2 below.

$$R = \frac{c\Delta T(f_{bd} - f_{bu})}{4\Delta F} \qquad \text{[Equation 1]}$$

$$V_r = \frac{c(f_{bd} - f_{bu})}{4f_0} \qquad \text{[Equation 2]}$$

In Equations 1 and 2, $\Delta F$ denotes a frequency difference between the minimum frequency and the maximum frequency of the transmitting signal, $\Delta T$ denotes a time difference (i.e., ½ of a period of the transmitting signal) between the minimum frequency and the maximum frequency of the transmitting signal, $f_{bu}$ denotes a frequency difference between the transmitting signal and the receiving signal in a frequency increase period (or a period in which the frequency of the transmitting signal increases), $f_{bd}$ denotes a frequency difference between the transmitting signal and the receiving signal in a frequency decrease period (or a period in which the frequency of the transmitting signal decreases), $f_0$ denotes an initial frequency of the transmitting signal, and c denotes the velocity of light.

In a FSK method, the frequency of the transmitting signal does not change linearly and continuously, but a plurality of transmitting signals of different frequencies are sequentially emitted for a predetermined time, and a phase difference and a frequency difference between the receiving signal and the transmitting signal are used to obtain distance information and velocity information. Compared to the FMCW method, the FSK method differs only in that the frequency of the transmitting signal is discontinuously discrete, and the principle for obtaining the distance information and the velocity information are substantially similar in the FMCW method and the FSK method.

The processor 110 may be configured to control the transmitter 120 and the receiver 130 based on the distance information and the velocity information extracted as described above. In particular, according to an example embodiment, the processor 110 may control the transmitter

120 and the receiver 130 to locally adjust a scanning resolution with respect to a forward region according to regions by using information about the relative velocity of the front object or the distance to the front object.

Figure 4:
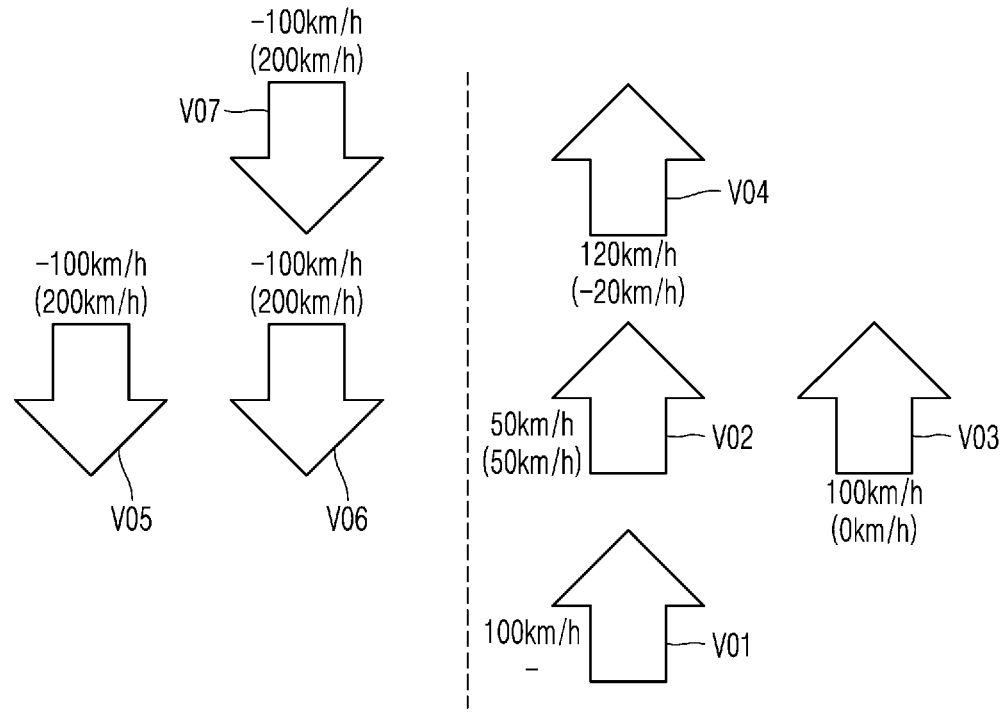
FIG. 4 illustrates an example of the a position and a velocity of objects in front of a radar apparatus according to an example embodiment.

FIG. 4 illustrates an example of the position and velocity of objects in front of the radar apparatus 100.

In FIG. 4, it is assumed that the radar apparatus 100 according to an example embodiment is mounted on a first vehicle V01, and the first vehicle V01 is moving at a velocity of 100 km per hour. Also, it is assumed that second to fourth vehicles V02, V03, and V04 move in the same direction as the first vehicle V01, the velocity of the second vehicle V02 is 50 km/h, the velocity of the third vehicle V03 is 100 km/h, and the velocity of the fourth vehicle V04 is 120 km/h. Also, it is assumed that fifth to seventh vehicles V05, V06, and V07 move in the opposite direction to the first vehicle V01 at a velocity of 100 km/h.

In the case shown in FIG. 4, the processor 110 may measure the relative velocity of the second vehicle V02 with respect to the first vehicle V01 as 50 km/h, the relative velocity of the third vehicle V03 as 0 km/h, the relative velocity of the fourth vehicle V04 as −20 km/h, and the relative velocity of the fifth to seventh vehicles V05, V06 and V07 as 200 km/h. Here, the negative relative velocity means becoming farther from the first vehicle V01 and the positive relative velocity means becoming closer to the first vehicle V01. In this situation, based on only the relative velocity, the fifth to seventh vehicles V05, V06, and V07 has the highest possibility of collision or crash with the first vehicle V01, the second vehicle V02 has the second highest possibility, and the third vehicle V03 and the fourth vehicle V04 have the lowest possibility.

To more precisely monitor a vehicle that has a relatively high probability to crash or collide with the first vehicle V01, the processor 110 may control the transmitter 120 and the receiver 130 to scan a front region in which the vehicle that is more likely to crash or collide with the first vehicle V01 is located at a higher resolution and scan a front region in which a vehicle that has a relatively low probability to crash or collide with the first vehicle V01 is located or a front region in which no front vehicle is present at a lower resolution.

Figure 5:
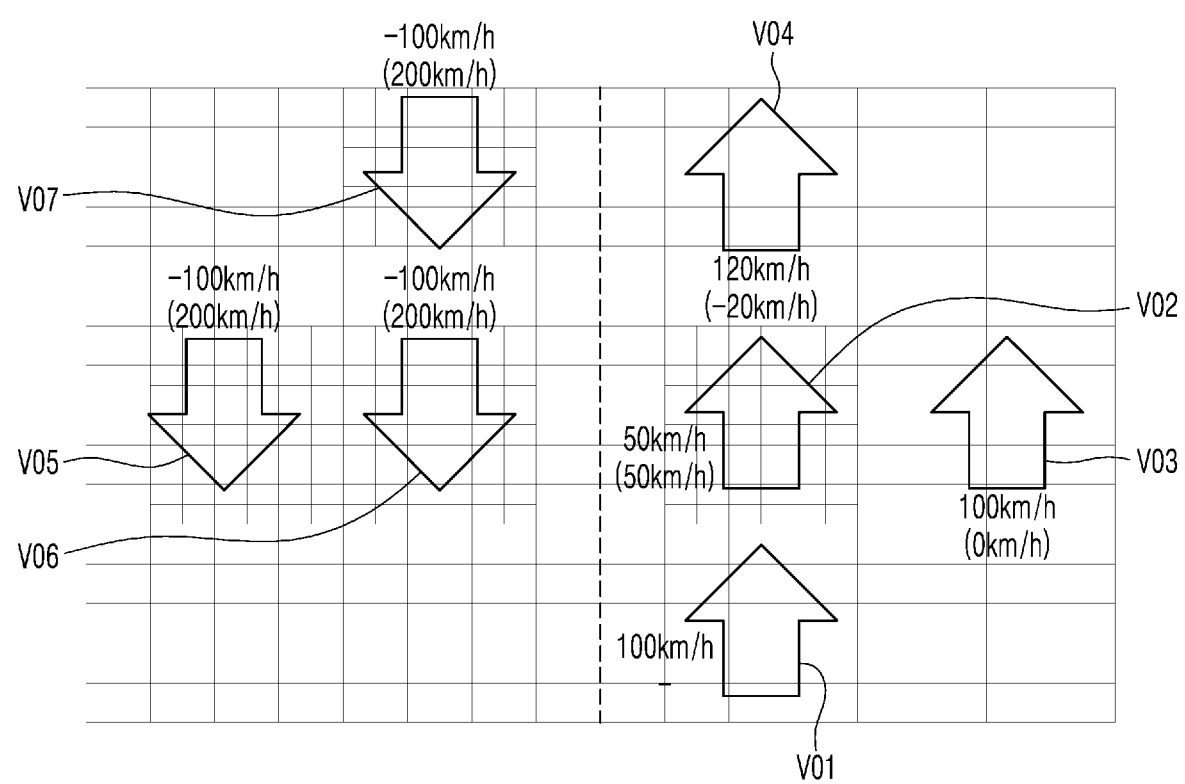
FIG. 5 illustrates an example of adjusting a local resolution by using velocity information of objects in front of a radar apparatus according to an example embodiment.
Figure 6:
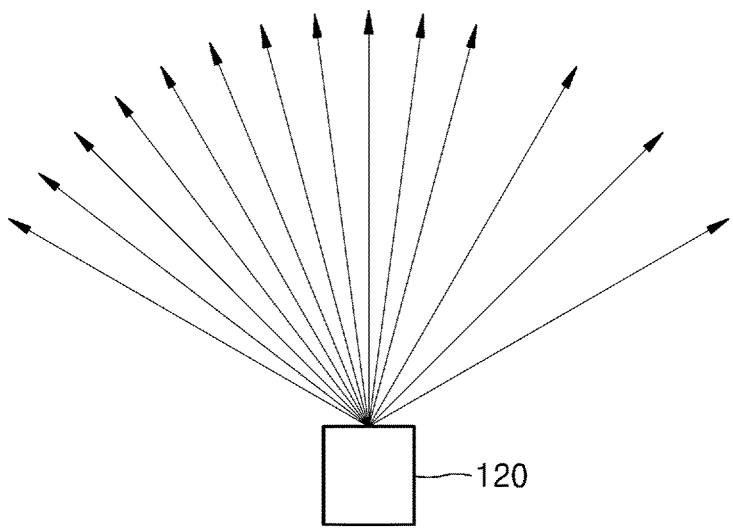
FIG. 6 illustrates a schematic example in which a transmitter of a radar apparatus according to an example embodiment scans a front of the radar apparatus in the example of FIG. 5.

FIG. 5 illustrates an example in which a local resolution is adjusted by using velocity information of front objects, and FIG. 6 illustrates a schematic example in which the transmitter 120 of the radar apparatus 100 scans a front of the radar apparatus 100 in the case illustrated in FIG. 5.

Referring to FIGS. 5 and 6, under the control of the processor 110, the transmitter 120 may scan a region having the third vehicle V03 and the fourth vehicle V04 that are less likely to crash or collide at a first resolution and scan a region having the second vehicle V02 and the fifth to seventh vehicles V05, V06, and V07 that are more likely to crash or collide at a second resolution higher than the first resolution. For example, the second resolution may be twice, three times, four times, or higher than the first resolution.

The region scanned at the first resolution and the region scanned at the second resolution may be determined based on a range of a relative velocity of other vehicles. For example, in the examples of FIGS. 5 and 6, the processor 110 may determine to scan a region having a vehicle of a relative velocity of less than 50 km/h at the first resolution and scan a region having a vehicle of a relative velocity of 50 km/h or more at the second resolution. However, a specific numerical value of the relative velocity to be used as a reference for determining the resolution is not necessarily limited thereto, and may be selected differently. For example, a driver may input a specific numerical value of the relative velocity to be used as the reference for determining the resolution.

By operating the radar apparatus 100 as described above, the radar apparatus 100 may efficiently search front objects without increasing the number of measurements per hour. In general, assuming that the maximum distance that the radar apparatus 100 may search is 200 m, in consideration of time of 1.33 us (i.e., $(2\times200 \text{ m})/(3\times10^8 \text{ m/s}))$ to be taken for light to reciprocate, measurements of about 750,000 per second may be possible. When it is assumed that a horizontal viewing angle is 50°, a horizontal resolution is 0.1°, a vertical viewing angle is 25°, a vertical resolution is 0.2°, and a frame rate is 20 frame/s, the required number of measurements per second is 3,000,000. Thus, the number of measurements per hour required to measure all front regions at the highest resolution is greater than the maximum number of measurements per hour limited by distance.

According to an example embodiment, the radar apparatus 100 may efficiently search the entire front region without increasing the maximum number of measurements per hour limited by distance, by increasing the number of measurements of the region having the vehicle that is more likely to crash or collide and reducing the number of measurements of the remaining region based on the relative velocity. However, the number of measurement per hour illustrated above is for ease of understanding only and may vary depending on the maximum distance that the radar apparatus 100 may search, a situation around the vehicle, and the performance of the transmitter 120 and the receiver 130.

The processor 110 may control the transmitter 120 to scan the entire front region of the vehicle on which the radar apparatus 100 is mounted at the first resolution in an initial stage having no distance information and velocity information of front vehicles. For example, the processor 110 may set the horizontal resolution to 0.2° and the vertical resolution to 0.4° in the initial stage. Alternatively, the processor 110 may control the transmitter 120 to scan the entire front region at a resolution lower than the first resolution in the initial stage. For example, the processor 110 may set the horizontal resolution to 0.3° and the vertical resolution to 0.6° in the initial stage. However, numerical values of the horizontal resolution and the vertical resolution described above are merely for ease of understanding and are not limited to the above examples.

Thereafter, the processor 110 may determine which region of the front regions to scan at the first resolution and which region to scan at the second resolution higher than the first resolution by using information collected based on the receiving signal detected by the receiver 130. For example, the processor 110 may control the transmitter 120 to scan a region having a vehicle of a relative velocity in a range that is higher than a preset reference value at the second resolution and to scan other regions at the first resolution. Also, the processor 110 may update information about distances to front objects and/or information about relative velocities of the front objects after completing the scanning of one frame with respect to the entire front region. Thereafter, the processor 110 may determine again a front region to be scanned at the first resolution and a front region to be scanned at the second resolution based on the updated information.

In FIGS. 5 and 6, the processor 110 adjusts the local resolution by using only the relative velocity information. However, the processor 110 may adjust the local resolution by additionally using distance information as well as the relative velocity information.

Figure 7:
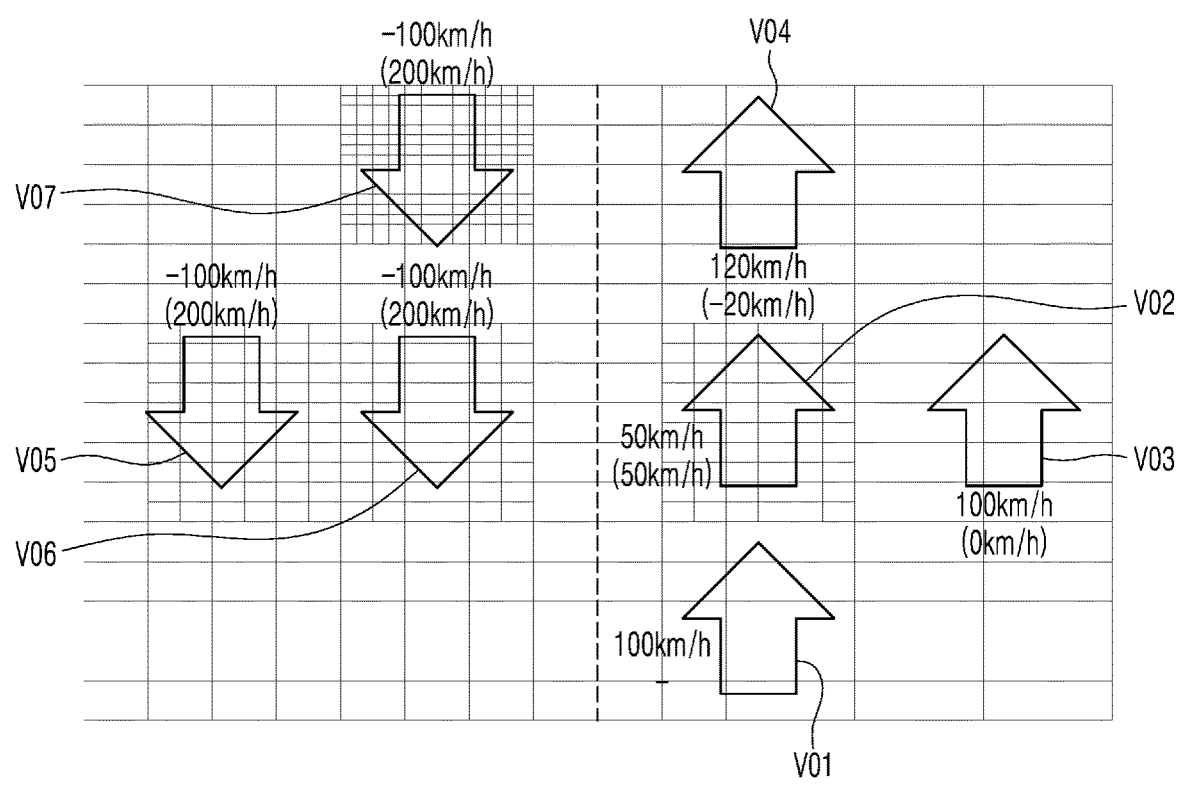
FIG. 7 shows an example of adjusting a local resolution by using a velocity and distance information of objects in front of a radar apparatus according to an example embodiment.
Figure 8:
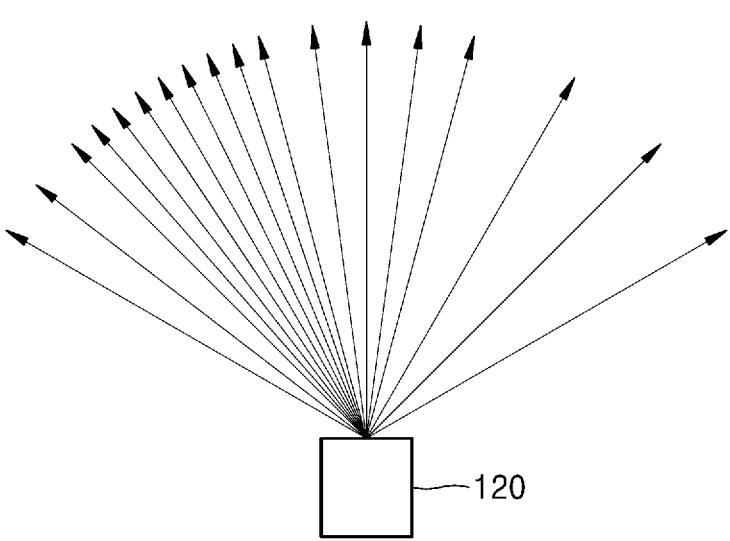
FIG. 8 illustrates a schematic example in which a transmitter of a radar apparatus according to an example embodiment scans a front of the radar apparatus in the example of FIG. 7.

FIG. 7 shows an example in which a local resolution is adjusted by using velocity and distance information of front objects, and FIG. 8 illustrates a schematic example in which the transmitter 120 of the radar apparatus 100 scans a front of the radar apparatus 100 in the case illustrated in FIG. 7.

In FIG. 7, similar to the example of FIG. 4 described above, it is assumed that the radar apparatus 100 is mounted on the vehicle V01, and, with respect to the vehicle V01, the relative velocity of the second vehicle V02 is 50 km/h, the relative velocity of the third vehicle V03 is 0 km/h, the relative velocity of the fourth vehicle V04 is −20 km/h, and the relative velocity of the fifth to seventh vehicles V05, V06, V07 is 200 km/h. When determining the scanning resolution only by the relative velocity, the fifth to seventh vehicles V05, V06, and V07 has the highest possibility of collision or crash with the first vehicle V01, the second vehicle V02 has the second highest possibility, and the third vehicle V03 and the fourth vehicle V04 have the lowest possibility. Among vehicles V05, V06, and V07 that have the highest possibility of collision or crash with the vehicle V01, the seventh vehicle V07 is farther from the first vehicle V01 than the other vehicles V06 and V07. Because objects with relatively long distances from the vehicle V01 appear smaller than objects with relatively close distances from the vehicle V01, vehicles farther away from the vehicle V01 among the vehicles that are more likely to crash or collide may be observed at a higher resolution.

For example, as shown in FIGS. 7 and 8, under the control of the processor 110, the transmitter 120 may scan a region having the third vehicle V03 and the fourth vehicle V04 that are less likely to crash or collide at a first resolution. In addition, the processor 110 may control the transmitter 120 to scan a region having the second vehicle V02, the fifth vehicle V05, and the sixth vehicle V06 with relatively close distances, among the second vehicle V02 and the fifth to seventh vehicles V05, V06, and V07 that are more likely to crash or collide, at a second resolution higher than the first resolution. In addition, the processor 110 may control the transmitter 120 to scan a region having the seventh vehicle V07 with a relatively far distance, among the second vehicle V02 and the fifth to seventh vehicles V05, V06, and V07 that are more likely to crash or collide, at a third resolution higher than the second resolution.

The processor 110 may adjust the resolution based on a previously input relative velocity range and a previously input distance range. For example, the processor 110 may increase the scanning resolution of a region having a vehicle farther than a previously input reference distance among vehicles having a relative velocity higher than a previously input reference velocity. The processor 110 may determine the scanning resolution as the first resolution with respect to a region having a relative velocity lower than the reference velocity even if the vehicle is farther than the previously input reference distance. In other words, the processor 110 may control the transmitter 120 to scan a front region having an object of the relative velocity within a first relative velocity range among front objects at the first resolution, scan a front region having an object of the relative velocity within a second relative velocity range higher than the first relative velocity range and within a first distance range in an approaching direction among the front objects at the second resolution higher than the first resolution, and scan a front region having an object of the relative velocity within the second relative velocity range and within a second distance range farther than the first distance range in the approaching direction among the front objects at the third resolution higher than the second resolution.

Figure 9:
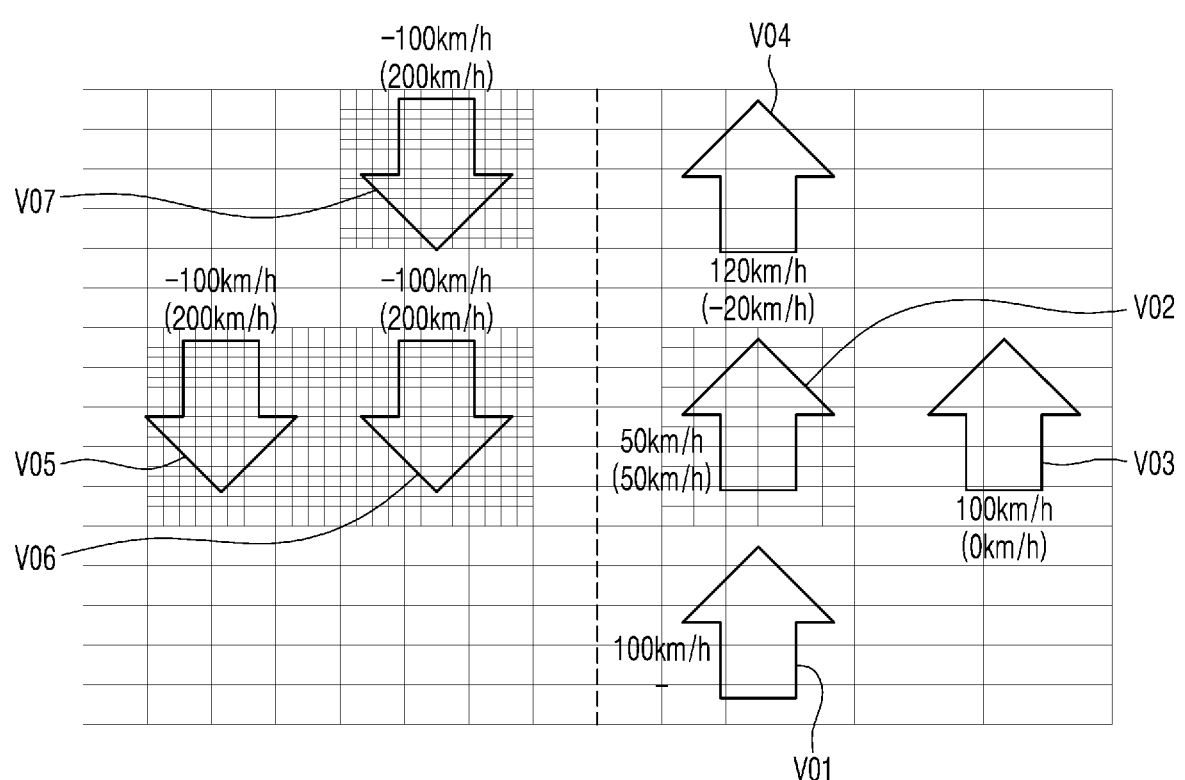
FIG. 9 shows another example of adjusting a local resolution by using velocity information of objects in front of a radar apparatus according to an example embodiment.

In the example embodiments described with reference to FIGS. 5 to 8, the processor 110 selects the first resolution and the second resolution based on one reference velocity, but the processor 110 may select one resolution from among a plurality of resolutions based on a plurality of reference velocity ranges. For example, FIG. 9 shows another example in which a local resolution is adjusted by using velocity information of front objects according to an example embodiment. In FIG. 9, similar to the example of FIG. 4 described above, it is assumed that, with respect to the vehicle V01 on which the radar apparatus 100 is mounted, the relative velocity of the second vehicle V02 is 50 km/h, the relative velocity of the third vehicle V03 is 0 km/h, the relative velocity of the fourth vehicle V04 is −20 km/h, and the relative velocity of the fifth to seventh vehicles V05, V06, V07 is 200 km/h.

As shown in FIG. 9, the processor 110 may control the transmitter 120 to scan a region having the third vehicle V03 and the fourth vehicle V04 having the relative velocities lower than a first reference velocity at a first resolution. Also, the processor 110 may control the transmitter 120 to scan a region having the second vehicle V02 having the relative velocity higher than the first reference velocity and lower than a second reference velocity at a second resolution higher than the first resolution. In addition, the processor 110 may scan a region having the fifth to seventh vehicles V05, V06, and V07 having the relative velocities higher than the second reference velocity at a third resolution higher than the second resolution.

In other words, the processor 110 may control the transmitter 120 to scan a front region having an object of the relative velocity within a first relative velocity range (or a range lower than the first reference velocity) among front objects at the first resolution, scan a front region having an object of the relative velocity within a second relative velocity range (or a range between the first reference velocity and the second reference velocity) higher than the first relative velocity range among the front objects at the second resolution higher than the first resolution, and scan a front region having an object of the relative velocity within a third relative velocity range (or a range higher than the second reference velocity) higher than the second relative velocity range among the front objects at the third resolution higher than the second resolution.

Figure 10:
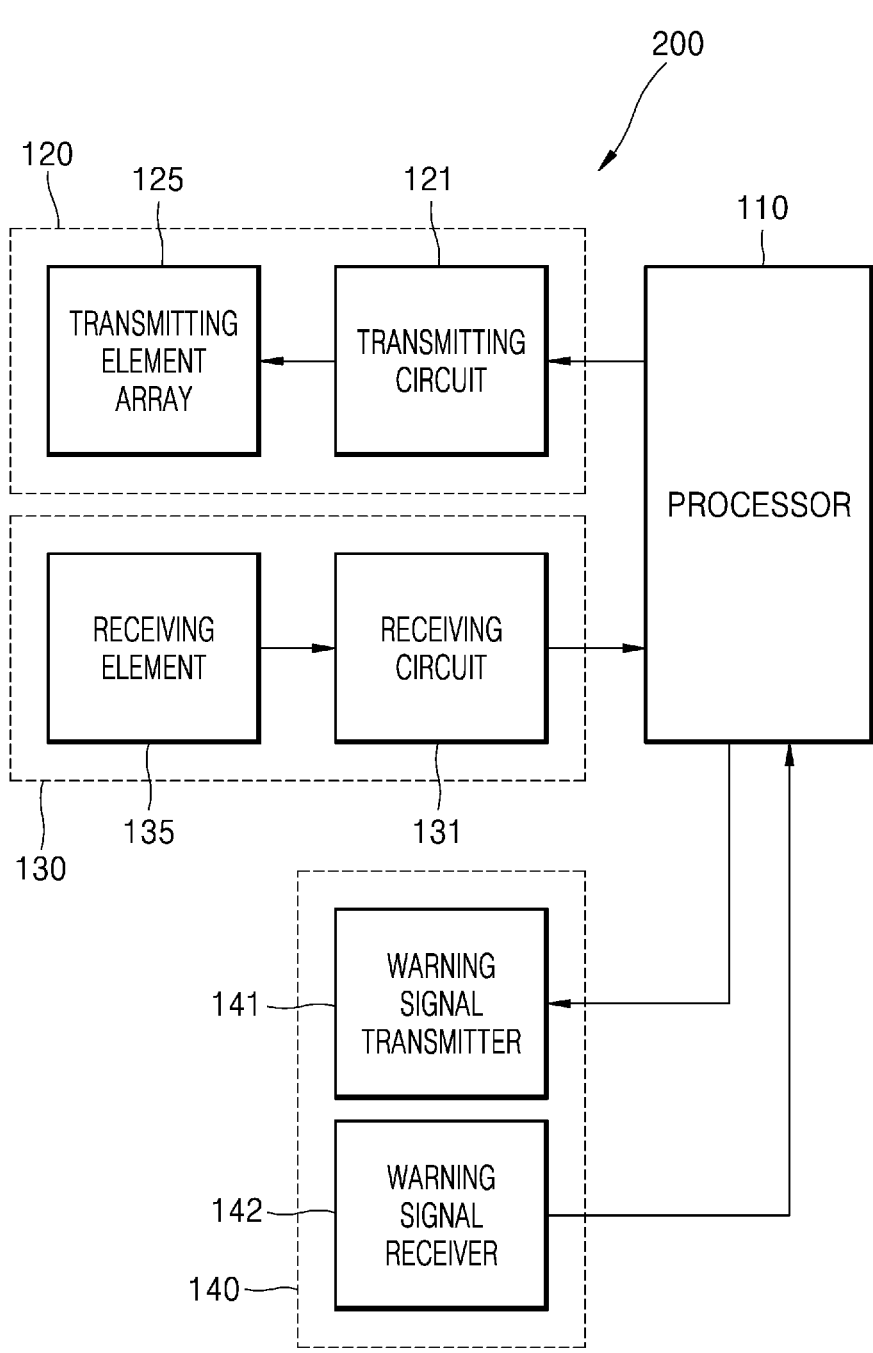
FIG. 10 is a schematic block diagram illustrating a configuration of a radar apparatus according to another example embodiment.

FIG. 10 is a block diagram schematically illustrating a configuration of a radar apparatus 200 according to another example embodiment.

Referring to FIG. 10, the radar apparatus 200 according to an example embodiment may further include a warning module 140 for transmitting and receiving a collision warning signal when compared with the radar apparatus 100 shown in FIG. 1. In addition, the warning module 140 may include a warning signal transmitter 141 that transmits a warning signal with respect to a possibility of collision and a warning signal receiver 142 that receives a warning signal with respect to a possibility of collision. For example, the warning signal transmitter 141 and the warning signal receiver 142 may transmit or receive the warning signals through a general 4G or 5G mobile communication technology, a wireless Internet technology such as WiMax, WiBro, Wi-Fi, etc., or a wireless communication technology having a dedicated frequency.

The processor 110 may be configured to calculate a possibility of collision with each front vehicle, based on extracted information about distances to front vehicles, azimuth positions of the front vehicles, relative velocities of the front vehicles, and/or the like. For example, the processor 110 may calculate the possibility of collision with each front vehicle by tracking changes over time such as distances to front vehicles in front of the radar apparatus 200, azimuth positions of the front vehicles, relative velocities of the front vehicles, etc. When the possibility of collision with any front vehicle is higher than a reference value as a calculation result, the processor 110 may control the warning signal transmitter 141 to transmit the warning signal including information about the relative position of the radar apparatus 200 with respect to the front vehicle that is more likely to collide (or the relative position of the front vehicle that is more likely to collide with respect to the radar apparatus 200), a possibility of collision, an estimated time of collision, etc.

Figure 11:
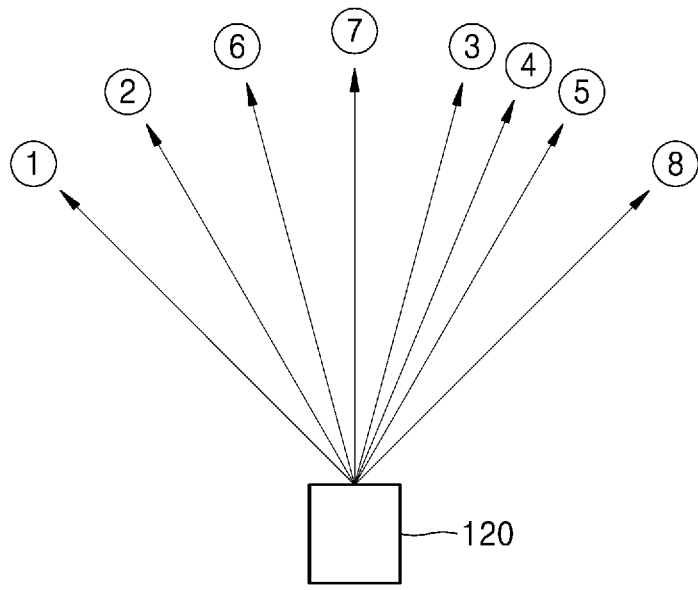
FIG. 11 illustrates an example order in which a transmitter of the radar apparatus illustrated in FIG. 10 scans a front environment.

In addition, the radar apparatus 200 may receive a collision warning signal from another vehicle through the warning signal receiver 142. When the collision warning signal is received, the processor 110 may control the transmitter 120 to stop a normal front scanning operation and to firstly scan a position included in the warning signal. For example, FIG. 11 illustrates an example order in which the transmitter 120 of the radar apparatus 200 illustrated in FIG. 10 scans a front environment. In general, the processor 110 may control the transmitter 120 to sequentially transmit electromagnetic waves in a predetermined direction when there is no warning signal received from the warning signal receiver 142. For example, the transmitter 120 may sequentially scan electromagnetic waves in a clockwise or counterclockwise direction.

However, upon receiving the warning signal from the warning signal receiver 142, the processor 110 analyzes information included in the warning signal to extract a direction of a front vehicle warned to have a high possibility of collision. Thereafter, the processor 110 controls the transmitter 120 to stop sequential scanning of electromagnetic waves and firstly transmits electromagnetic waves in the direction included in the warning signal. For example, referring to FIG. 11, it is assumed that the warning signal is received from the warning signal receiver 142 during the scanning of electromagnetic waves sequentially in directions ① and ② in the clockwise direction. When the direction warned to have a high possibility of collision in the warning signal is direction ④, the processor 110 may firstly scan a periphery of the direction ④ at a high resolution. For example, the processor 110 may control the transmitter 120 to scan directions ③, ④, and ⑤ at a second resolution or at a third resolution.

Thereafter, when an analysis result of the processor 110 indicates that the possibility of collision is lower than a reference value, the processor 110 may control the transmitter 120 to sequentially perform scanning again from a next point of a point where scanning is urgently interrupted. For example, when scanning is urgently interrupted after completing scanning with respect to the ② direction, the processor 110 may control the transmitter 120 to sequentially perform scanning again in directions ⑥, ⑦, and ⑧.

The processor 110 may calculate the possibility of collision between any two vehicles among front vehicles based on extracted information about the distances to the front vehicles, the azimuth positions of the front vehicles, the relative velocities of the front vehicles, and/or the lie. For example, when the distances to vehicles in front of the radar apparatus 200, the azimuth positions of the vehicles, and the relative velocities of the vehicles are known, the processor 110 may calculate the possibility of collision between any two vehicles among the front vehicles based on the distance between the two vehicles, positions of the two vehicles, and relative velocities of the two vehicles. In addition, the processor 110 may calculate the possibility of collision between any two vehicles among the front vehicles based on a temporal change in the distance between the two vehicles, the positions, and the relative velocities. When the calculated possibility of collision is higher than the reference value, the processor 110 may control the warning signal transmitter 141 to transmit to the two vehicles a warning signal including information about the relative positions of the two vehicles having a high possibility of collision.

While the radar apparatuses 100 and 200 are mounted on a vehicle to locally adjust scanning resolutions with respect to front regions according to regions based on information about the distances to the front vehicles and the relative velocities of the front vehicles, the apparatuses 100 and 200 are not necessarily applicable only to the vehicle. For example, the radar apparatuses 100 and 200 according to an example embodiment may include LiDAR sensors that may be mounted on a ship, an aircraft, or a drone, in addition to the vehicle, and may be used to search and avoid obstacles in front of the ship, the aircraft, the drone, etc.

While the radar apparatus and the method of operating the radar apparatus according to example embodiments have been particularly shown and described with reference to example embodiments thereof, the example embodiments have merely been used to explain the disclosure and should not be construed as limiting the scope of the disclosure as defined by the claims. The example embodiments should be considered in a descriptive sense only and not for purposes of limitation. Therefore, the scope of the disclosure is defined not by the detailed description of the disclosure but by the appended claims, and all differences within the scope will be construed as being included in the disclosure.

It should be understood that example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A radar apparatus comprising:
a transmitter configured to transmit electromagnetic waves, the transmitter being configured to steer the electromagnetic waves to scan a front region;
a receiver configured to receive electromagnetic waves that are reflected; and
a processor configured to extract a relative velocity, with respect to the radar apparatus, of at least one front object based on the electromagnetic waves received by the receiver,
wherein the processor is further configured to extract a distance to the at least one front object, and locally adjust a horizontal angular resolution and a vertical angular resolution of steering the electromagnetic waves in scanning the front region based on the distance to the at least one front object, and
wherein the processor is further configured to:
control the transmitter to scan, at a first horizontal/vertical angular resolution, a first front region in which a first object moves at a relative velocity within a first relative velocity range and within a first distance range in a direction approaching to the radar apparatus;
control the transmitter to scan, at a second horizontal/vertical angular resolution higher than the first horizontal/vertical angular resolution, a second front region in which a second object moves at a relative velocity within the first relative velocity range and within a second distance range farther than the first distance range in the direction approaching the radar apparatus; and
control the transmitter to scan, at a third horizontal/vertical angular resolution higher than the second horizontal/vertical angular resolution, a third front region in which a third object moves at a relative velocity within a second relative velocity range higher than the first relative velocity range and within the second distance range in the direction approaching the radar apparatus.

2. The radar apparatus of claim 1, wherein the processor is configured to locally adjust the horizontal angular resolution and the vertical angular resolution of steering the electromagnetic waves in scanning the front region based on the distance to the at least one front object, such that the horizontal angular resolution and the vertical angular resolution are increased in an area in which a front object is present at a farther distance and are decreased in an area in which a front object is present at a closer distance.

3. The radar apparatus of claim 2, wherein the processor is further configured to locally adjust the horizontal angular resolution and the vertical angular resolution of steering the electromagnetic waves in scanning the front region further based on the relative velocity of the at least one front object, such that the horizontal angular resolution and the vertical angular resolution are increased in an area in which a front object of a higher relative velocity is present and are decreased in an area in which a front object of a lower relative velocity is present.

4. The radar apparatus of claim 3, wherein the processor is further configured to control the transmitter to scan, at a fourth horizontal/vertical angular resolution higher than the third horizontal/vertical angular resolution, a fourth front region in which a fourth object moves at a relative velocity within a third relative velocity range higher than the second relative velocity range and within the second distance range in the direction approaching the radar apparatus.

5. The radar apparatus of claim 1, wherein the processor is further configured to control the transmitter to scan an entire front region at the first horizontal/vertical angular resolution in an initial stage.

6. The radar apparatus of claim 1, wherein the processor is further configured to control the transmitter to scan an entire front region at a resolution less than the first horizontal/vertical angular resolution in an initial stage.

7. The radar apparatus of claim 1, wherein the processor is further configured to update information about the relative velocity of the at least one front object after completing scanning in one frame with respect to an entire front region and again locally adjust the horizontal angular resolution and the vertical angular resolution based on the updated information.

8. The radar apparatus of claim 1, wherein the transmitter comprises:
a transmitting element array comprising a plurality of transmitting elements which are one-dimensionally or two-dimensionally arranged; and a transmitting circuit configured to provide transmission signals to the plurality of transmitting elements, and wherein the processor is further configured to control the transmitting circuit such that, based on the transmission signals, phases of the electromagnetic waves emitted from the plurality of transmitting elements change according to a front region to which the electromagnetic waves are to be transmitted.

9. The radar apparatus of claim 1, wherein the processor is further configured to determine a possibility of collision with a front object from among the at least one front object, based on information about the extracted distance to the front object and the relative velocity of the front object.

10. A light detection and ranging (LiDAR) apparatus comprising:

a transmitter configured to transmit laser light, the transmitter being configured to steer the laser light to scan a front region;

a photodetector configured to receive laser light that is reflected; and a processor configured to extract a relative velocity, with respect to the LiDAR apparatus, of at least one front object based on the laser light received by the photodetector, wherein the processor is further configured to extract a distance to the at least one front object, and locally adjust a horizontal angular resolution and a vertical angular resolution of steering the laser light in scanning the front region based on the distance to the at least one front object, and wherein the processor is further configured to:

control the transmitter to scan, at a first horizontal/vertical angular resolution, a first front region in which a first object moves at a relative velocity within a first relative velocity range and within a first distance range in a direction approaching to the LiDAR apparatus;

control the transmitter to scan, at a second horizontal/vertical angular resolution higher than the first horizontal/vertical angular resolution, a second front region in which a second object moves at a relative velocity within the first relative velocity range and within a second distance range farther than the first distance range in the direction approaching the LiDAR apparatus; and control the transmitter to scan, at a third horizontal/vertical angular resolution higher than the second horizontal/vertical angular resolution, a third front region in which a third object moves at a relative velocity within a second relative velocity range higher than the first relative velocity range and within the second distance range in the direction approaching the LiDAR apparatus.

11. The LiDAR apparatus of claim 10, wherein the processor is configured to locally adjust the horizontal angular resolution and the vertical angular resolution of steering the laser light in scanning the front region based on the distance to the at least one front object, such that the horizontal angular resolution and the vertical angular resolution are increased in an area in which a front object is present at a farther distance and are decreased in an area in which a front object is present at a closer distance.

12. The LiDAR apparatus of claim 11, wherein the processor is further configured to locally adjust the horizontal angular resolution and the vertical angular resolution of steering the laser light in scanning the front region further based on the relative velocity of the at least one front object, such that the horizontal angular resolution and the vertical angular resolution are increased in an area in which a front object of a higher relative velocity is present and are decreased in an area in which a front object of a lower relative velocity is present.

13. The LiDAR apparatus of claim 12, wherein the processor is further configured to control the transmitter to scan, at a fourth horizontal/vertical angular resolution higher than the third horizontal/vertical angular resolution, a fourth front region in which a fourth object moves at a relative velocity within a third relative velocity range higher than the second relative velocity range and within the second distance range in the direction approaching the LiDAR apparatus.

14. The LiDAR apparatus of claim 10, wherein the processor is further configured to control the transmitter to scan an entire front region at the first horizontal/vertical angular resolution in an initial stage.

15. The LiDAR apparatus of claim 10, wherein the processor is further configured to control the transmitter to scan an entire front region at a resolution less than the first horizontal/vertical angular resolution in an initial stage.

16. The LiDAR apparatus of claim 10, wherein the processor is further configured to update information about the relative velocity of the at least one front object after completing scanning in one frame with respect to an entire front region and again locally adjust the horizontal angular resolution and the vertical angular resolution based on the updated information.

17. The LiDAR apparatus of claim 10, wherein the processor is further configured to determine a possibility of collision with a front object from among the at least one front object, based on information about the extracted distance to the front object and the relative velocity of the front object.

* * * * *